United States Patent
Liu et al.

(10) Patent No.: US 12,556,624 B2
(45) Date of Patent: Feb. 17, 2026

(54) DATA TRANSMISSION METHOD, APPARATUS, AND SYSTEM

(71) Applicant: HUAWEI TECHNOLOGIES CO., LTD., Guangdong (CN)

(72) Inventors: Hang Liu, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 17/975,453

(22) Filed: Oct. 27, 2022

(65) Prior Publication Data
US 2023/0064935 A1 Mar. 2, 2023

Related U.S. Application Data

(63) Continuation of application No. PCT/CN2020/087923, filed on Apr. 29, 2020.

(51) Int. Cl.
*H04L 69/323* (2022.01)
*H04L 1/1867* (2023.01)
(Continued)

(52) U.S. Cl.
CPC ............ *H04L 69/323* (2013.01); *H04L 1/189* (2013.01); *H04L 69/321* (2013.01); *H04L 12/00* (2013.01)

(58) Field of Classification Search
CPC ... H04L 69/322; H04L 69/323; H04L 69/325; H04L 1/1867; H04L 1/189; H04L 69/30;
(Continued)

(56) References Cited

U.S. PATENT DOCUMENTS

2009/0016290 A1* 1/2009 Chion ................... H04W 88/04
370/349
2009/0116490 A1* 5/2009 Charpentier ............ H04L 69/16
370/395.1
(Continued)

FOREIGN PATENT DOCUMENTS

CN 107979853 A 5/2018
CN 108337214 A 7/2018
(Continued)

OTHER PUBLICATIONS

Huawei et al., "TP to TR 38.885 on QoS support for NR V2X," 3GPP TSG-RAN WG2 Meeting #105, R2-1902500, Athens, Greece, Feb. 25-Mar. 1, 2019, 8 pages.
(Continued)

*Primary Examiner* — Warner Wong
(74) *Attorney, Agent, or Firm* — Fish & Richardson P.C.

(57) ABSTRACT

A data transmission method, an apparatus, and a system are provided to optimize a data transmission manner in an intelligent cockpit scenario, and relate to the short-range communications field. In this application, a first communications apparatus may indicate, to a second communications apparatus, a first service and a first resource corresponding to the first service. When the second communications apparatus needs to send first data of the first service, a media access control layer of the second communications apparatus may transparently transmit the data of the first service. Correspondingly, when the first communications apparatus receives the first data of the first service, a media access control layer of the first communications apparatus transparently transmits the first data.

32 Claims, 4 Drawing Sheets

(51) Int. Cl.
*H04L 69/321* (2022.01)
*H04L 12/00* (2006.01)

(58) Field of Classification Search
CPC ....... H04L 69/32; H04L 69/321; H04L 67/00; H04L 12/00; H04L 69/00; H04W 72/231; H04W 72/232; H04W 80/02; H04W 80/04
See application file for complete search history.

(56) References Cited

U.S. PATENT DOCUMENTS

| | | | |
|---|---|---|---|
| 2011/0205961 A1 | 8/2011 | Santivanez et al. | |
| 2013/0107797 A1* | 5/2013 | Chion | H04W 72/04 370/329 |
| 2019/0124572 A1* | 4/2019 | Park | H04W 36/0033 |
| 2019/0132881 A1* | 5/2019 | Byun | H04L 5/0048 |
| 2019/0166610 A1* | 5/2019 | Lee | H04W 52/325 |
| 2021/0014731 A1* | 1/2021 | Ohta | H04L 1/0084 |
| 2021/0136802 A1* | 5/2021 | Cirik | H04B 7/0695 |
| 2021/0168647 A1* | 6/2021 | Li | H04W 28/0263 |
| 2022/0061074 A1* | 2/2022 | Babaei | H04L 5/0053 |
| 2022/0210821 A1* | 6/2022 | Miao | H04W 72/1273 |

FOREIGN PATENT DOCUMENTS

| | | | |
|---|---|---|---|
| CN | 109511135 | * 3/2019 | ........... H04W 72/23 |
| CN | 109831781 A | 5/2019 | |
| CN | 110474854 A | 11/2019 | |
| EP | 3562119 A1 | 10/2019 | |
| WO | 2011137783 A1 | 11/2011 | |
| WO | 2020061768 A1 | 4/2020 | |

OTHER PUBLICATIONS

Extended European Search Report in European Appln No. 20933718.7, dated Apr. 4, 2023, 9 pages.
International Search Report and Written Opinion in International Appln. No. PCT/CN2020/087923, mailed on Jan. 19, 2021, 19 pages (with English translation).

* cited by examiner

DATA TRANSMISSION METHOD, APPARATUS, AND SYSTEM

CROSS-REFERENCE TO RELATED APPLICATIONS

This application is a continuation of International Application No. PCT/CN2020/087923, filed on Apr. 29, 2020. The disclosure of which is hereby incorporated by reference in its entirety.

TECHNICAL FIELD

This application relates to the field of communications technologies, and in particular, to a data transmission method, an apparatus, and a system.

BACKGROUND

Vehicles play an increasingly important role in people's daily life. As intelligent cockpit technologies continuously develop, vehicles are not only transportation tools, but also one kind of living space for people. People expect an intelligent cockpit to provide them with richer entertainment, audio, video, and office experience.

Currently, connection devices in the intelligent cockpit mainly include a cockpit domain controller (cockpit domain controller, CDC) (or referred to as a head unit) and an in-vehicle device. The in-vehicle device may be classified into a vehicular device, a non-vehicular device, and the like. The vehicular device may include an audio and video device such as a speaker or a microphone, or a vehicular screen. The non-vehicular device may include an intelligent terminal such as a mobile phone or a tablet computer. The CDC is mainly connected to the vehicular device in the vehicle in a wired manner. Cable routing is difficult, and a space occupation problem exists. In addition, the CDC may also perform wireless communication with the vehicular device or the non-vehicular device by using a wireless communications technology such as Bluetooth or wireless fidelity (wireless fidelity, Wi-Fi). However, relatively complex protocol stack processing is usually performed on a data packet at a protocol stack in a conventional wireless communications technology, to adapt to transmission requirements of different service types in a wireless communications scenario. However, for a relatively simple data service in an intelligent cockpit scenario, processing steps at the protocol stack in the conventional wireless communications technology are excessively complex. As a result, differentiated service transmission requirements of the vehicular device and the non-vehicular device cannot be met at the same time, and data transmission efficiency is relatively low.

SUMMARY

This application provides a data transmission method, an apparatus, and a system, to improve data transmission efficiency in an intelligent cockpit scenario.

According to a first aspect, an embodiment of this application provides a data transmission method. The method may be performed by a first communications apparatus, or may be performed by a component (such as a processor, a chip, or a chip system) of the first communications apparatus. The first communications apparatus may be a CDC. Descriptions are provided below by using an example in which an execution body is the first communications apparatus. According to the method, the first communications apparatus may send first information to a second communications apparatus, where the first information is used to indicate a first service and a first resource corresponding to the first service, the first resource may be to be used by the second communications apparatus to send first data to the first communications apparatus, and the first data belongs to the first service. A media access control (media access control, MAC) layer of the first communications apparatus may obtain the first data, and transparently transmit the first data to an upper layer.

According to the method, the first communications apparatus can indicate, to the second communications apparatus, the first service and the first resource corresponding to the first service. When the second communications apparatus needs to send the first data of the first service, a MAC layer of the second communications apparatus can transparently transmit the data of the first service. Correspondingly, when the first communications apparatus receives the first data of the first service, the MAC layer of the first communications apparatus transparently transmits the first data. Therefore, compared with a wireless communications protocol in the conventional technology, this application simplifies processing steps at MAC layers at a transmit end and a receive end, and improves data transmission efficiency while implementing wireless transmission of the data of the first service between a primary node and a secondary node.

In a possible design, the upper layer is a logical link control (logical link control, LLC) layer, a network and transport layer, a device layer, or an application of the first communications apparatus.

In a possible design, a physical (physical, PHY) layer of the first communications apparatus may receive the first data from the second communications apparatus on the first resource. Then, the PHY layer of the first communications apparatus may submit the first data and indication information of the first resource to the MAC layer of the first communications apparatus.

In a possible design, the MAC layer of the first communications apparatus may further determine that the first data belongs to the first service, and then transparently transmit the first data to the upper layer.

In a possible design, the MAC layer of the first communications apparatus may determine, based on the indication information of the first resource and a correspondence between the first resource and the first service, that the first data belongs to the first service, where the indication information of the first resource is from the PHY layer of the first communications apparatus. For example, the indication information of the first resource is carried in a service access point (service access point, SAP) of the PHY layer.

In a possible design, the MAC layer of the first communications apparatus may submit a PHY service data unit (service data unit, SDU) from the PHY layer of the first communications apparatus to the LLC layer of the first communications apparatus; or the MAC layer of the first communications apparatus may submit a PHY SDU from the PHY layer of the first communications apparatus to the device layer; or the MAC layer of the first communications apparatus submits a PHY SDU from the PHY layer of the first communications apparatus to the application, where the PHY SDU corresponds to the first data. Specifically, the PHY SDU is the first data.

In a possible design, the first information is further used to indicate a MAC layer of the second communications apparatus to transparently transmit the first data to a PHY layer of the second communications apparatus.

Specifically, the first information may be used to indicate the MAC layer of the second communications apparatus to transfer a MAC protocol data unit (protocol data unit, PDU) to the PHY layer of the second communications apparatus, where the MAC PDU includes only a MAC SDU, and the MAC SDU includes the first data.

In a possible design, the first information may include at least one of type information of the first service, priority information of the first service, or quality of service (quality of service, QoS) information of the first service, to indicate the first service.

In a possible design, the first communications apparatus may further send second information to the second communications apparatus, where the second information is used to activate the first resource or used to activate transmission of the first service, and the second information includes at least one of configuration information of the first resource, the type information of the first service, the priority information of the first service, or the QoS information of the first service.

In a possible design, if the first resource is a semi-persistent resource, the configuration information of the first resource may include a semi-persistent scheduling identifier.

In a possible design, the LLC layer of the first communications apparatus may submit a MAC SDU from the MAC layer of the first communications apparatus to the network and transport layer of the first communications apparatus, where the MAC SDU corresponds to the first data. Specifically, the MAC SDU is the first data.

In a possible design, the MAC layer of the first communications apparatus sends third information to the LLC layer of the first communications apparatus, where the third information may be used to indicate the LLC layer of the first communications apparatus to transparently transmit the first data to the network and transport layer of the first communications apparatus.

In a possible design, the network and transport layer of the first communications apparatus may submit an LLC SDU from the LLC layer of the first communications apparatus to the device layer of the first communications apparatus, where the LLC SDU corresponds to the first data. Specifically, the LLC SDU is the first data.

In a possible design, the LLC layer of the first communications apparatus sends fourth information to the network and transport layer of the first communications apparatus, where the fourth information is used to indicate the network and transport layer of the first communications apparatus to transparently transmit the first data to the device layer of the first communications apparatus. The fourth information may be carried in an SAP that is sent by the LLC layer of the first communications apparatus to the network and transport layer of the first communications apparatus.

According to a second aspect, an embodiment of this application provides a data transmission method. The method may be performed by a second communications apparatus, or may be performed by a component (such as a processor, a chip, or a chip system) of the second communications apparatus. The second communications apparatus may be a vehicular device, for example, a sound box or a microphone, or the second communications apparatus may be a non-vehicular device, for example, a wearable device.

The second communications apparatus is used as an example. According to the method, the second communications apparatus may receive first information from a first communications apparatus, where the first information is used to indicate a first service and a first resource corresponding to the first service, the first resource is to be used by the second communications apparatus to send first data to the first communications apparatus, and the first data belongs to the first service. A MAC layer of the second communications apparatus may obtain the first data from an upper layer, and transparently transmit the first data to a PHY layer of the second communications apparatus.

In a possible design, the PHY layer of the second communications apparatus may send the first data to the first communications apparatus on the first resource.

In a possible design, the upper layer is an LLC layer, a network and transport layer, a device layer, or an application of the second communications apparatus.

In a possible design, after determining that the first data belongs to the first service, the MAC layer of the second communications apparatus transparently transmits the first data to the PHY layer of the second communications apparatus.

In a possible design, the MAC layer of the second communications apparatus may determine, based on indication information of the first service, that the first data belongs to the first service, where the indication information of the first service is from the upper layer of the second communications apparatus.

In a possible design, the MAC layer of the second communications apparatus may obtain an LLC PDU from the LLC layer of the second communications apparatus, where the LLC PDU corresponds to the first data, and specifically, the LLC PDU is the first data; or the MAC layer of the second communications apparatus may obtain a device layer PDU from the device layer of the second communications apparatus, where the device layer PDU corresponds to the first data, and specifically, the device layer PDU is the first data; or the MAC layer of the second communications apparatus may obtain application data from the application of the second communications apparatus, where the application data corresponds to the first data, and specifically, the application data is the first data.

In a possible design, the first information is further used to indicate the MAC layer of the second communications apparatus to transparently transmit the first data to the PHY layer of the second communications apparatus.

In a possible design, the MAC layer of the second communications apparatus may transfer a MAC PDU to the PHY layer of the second communications apparatus, where the MAC PDU includes only a MAC SDU, and the MAC SDU includes the first data. Specifically, the MAC SDU is the first data.

Specifically, the first information may indicate the MAC layer of the second communications apparatus to transfer the MAC PDU to the PHY layer of the second communications apparatus, where the MAC PDU includes only the MAC SDU, and the MAC SDU includes the first data. Specifically, the MAC SDU is the first data.

In a possible design, the first information may include at least one of type information of the first service, priority information of the first service, or QoS information of the first service; and the at least one of the type information of the first service, the priority information of the first service, or the QoS information of the first service is used to indicate the first service.

In a possible design, the second communications apparatus may further receive second information from the first communications apparatus, where the second information may be used to activate the first resource or used to activate transmission of the first service, and the second information may include at least one of configuration information of the first resource, the type information of the first service, the priority information of the first service, or the QoS information of the first service.

In a possible design, if the first resource is a semi-persistent resource, the configuration information of the first resource is a semi-persistent scheduling identifier.

In a possible design, the network and transport layer of the second communications apparatus may transfer the device layer PDU from the device layer of the second communications apparatus to the LLC layer of the second communications apparatus, where the device layer PDU of the second communications apparatus corresponds to the first data, and the device layer PDU includes only a device layer SDU. Specifically, the device layer PDU is the first data.

In a possible design, the device layer of the second communications apparatus may send fifth information to the network and transport layer of the second communications apparatus, where the fifth information is used to indicate the network and transport layer of the second communications apparatus to transparently transmit the first data to the LLC layer of the second communications apparatus.

In a possible design, the LLC layer of the second communications apparatus may transfer the LLC PDU from the network and transport layer of the second communications apparatus to the MAC layer of the second communications apparatus, where the LLC PDU corresponds to the first data, and the LLC PDU includes only an LLC SDU. Specifically, the LLC PDU is the first data.

In a possible design, the network and transport layer of the second communications apparatus may send sixth information to the LLC layer of the second communications apparatus, where the sixth information may be used to indicate the LLC layer of the second communications apparatus to transparently transmit the first data to the MAC layer of the second communications apparatus.

According to a third aspect, a communications apparatus is provided. The communications apparatus may be a first communications apparatus, or may be a chip or a module in the first communications apparatus, or may be a chip or a system-on-a-chip.

The communications apparatus may include a receiving module and a processing module. The communications module may be configured to support the communications apparatus in communication. The communications module may also be referred to as a communications unit, a communications interface, a transceiver module, or a transceiver unit. The communications module may be configured to include a PHY layer, a MAC layer, an LLC layer, a network and transport layer, a device layer, or an application. The processing module may be configured to support the communications apparatus in performing the processing action performed by the first communications apparatus in the method according to any one of the first aspect or the possible designs of the first aspect.

Specifically, the communications module may be configured to send first information to a second communications apparatus, where the first information is used to indicate a first service and a first resource corresponding to the first service, the first resource may be to be used by the second communications apparatus to send first data to the communications apparatus, and the first data belongs to the first service. The MAC layer of the communications module may obtain the first data, and transparently transmit the first data to an upper layer.

In a possible design, the upper layer is a logical link control LLC layer, a network and transport layer, a device layer, or an application of the communications module.

In a possible design, the PHY layer of the communications module may receive the first data from the second communications apparatus on the first resource. Then, the PHY layer of the communications module may submit the first data and indication information of the first resource to the MAC layer of the communications module.

In a possible design, the MAC layer of the communications module may further determine that the first data belongs to the first service, and then transparently transmit the first data to the upper layer.

In a possible design, the MAC layer of the communications module may determine, based on the indication information of the first resource and a correspondence between the first resource and the first service, that the first data belongs to the first service. The indication information of the first resource is from the PHY layer of the communications module. For example, the indication information of the first resource is carried in an SAP from the PHY layer of the communications module.

In a possible design, the MAC layer of the communications module may submit a PHY SDU from the PHY layer of the communications module to the LLC layer of the communications module, or the MAC layer of the communications module may submit a PHY SDU from the PHY layer of the communications module to the device layer, or the MAC layer of the communications module submits a PHY SDU from the PHY layer of the communications module to the application, where the PHY SDU corresponds to the first data. Specifically, the PHY SDU is the first data.

In a possible design, the first information is further used to indicate a MAC layer of the second communications apparatus to transparently transmit the first data to a PHY layer of the second communications apparatus.

Specifically, the first information may be used to indicate the MAC layer of the second communications apparatus to transfer a MAC PDU to the PHY layer of the second communications apparatus, where the MAC PDU includes only a MAC SDU, and the MAC SDU includes the first data.

In a possible design, the first information may include at least one of type information of the first service, priority information of the first service, or QoS information of the first service, to indicate the first service.

In a possible design, the communications module may further send second information to the second communications apparatus, where the second information is used to activate the first resource or used to activate transmission of the first service, and the second information includes at least one of configuration information of the first resource, the type information of the first service, the priority information of the first service, or the QoS information of the first service.

In a possible design, if the first resource is a semi-persistent resource, the configuration information of the first resource may include a semi-persistent scheduling identifier.

In a possible design, the LLC layer of the communications module may submit the MAC SDU from the MAC layer of the communications module to the network and transport layer of the communications module, where the MAC SDU corresponds to the first data. Specifically, the MAC SDU is the first data.

In a possible design, the MAC layer of the communications module may send third information to the LLC layer of the communications module, where the third information may be used to indicate the LLC layer of the communications module to transparently transmit the first data to the network and transport layer of the communications module.

In a possible design, the network and transport layer of the communications module may submit an LLC SDU from the LLC layer of the communications module to the device layer of the communications module, where the LLC SDU corresponds to the first data. Specifically, the LLC SDU is the first data.

In a possible design, the LLC layer of the communications module may send fourth information to the network and transport layer of the communications module, where the fourth information is used to indicate the network and transport layer of the communications module to transparently transmit the first data to the device layer of the communications module, and the fourth information may be carried in an SAP that is sent by the LLC layer of the communications module to the network and transport layer of the communications module.

According to a fourth aspect, a communications apparatus is provided. The communications apparatus may be a second communications apparatus, or may be a chip or a module in the second communications apparatus, or may be a chip or a system-on-a-chip.

The communications apparatus may include a receiving module and a processing module. The communications module may be configured to support the communications apparatus in communication. The communications module may also be referred to as a communications unit, a communications interface, a transceiver module, or a transceiver unit. The communications module may be configured to include a PHY layer, a MAC layer, an LLC layer, a network and transport layer, a device layer, or an application, and configured to perform the steps performed by the PHY layer, the MAC layer, the LLC layer, the network and transport layer, the device layer, or the application in the method according to any one of the second aspect or the possible designs of the second aspect. The processing module may be configured to support the communications apparatus in performing the processing action performed by the first communications apparatus in the method according to any one of the second aspect or the possible designs of the second aspect.

Specifically, the communications module may be configured to receive first information from a first communications apparatus, where the first information is used to indicate a first service and a first resource corresponding to the first service, the first resource is to be used by the communications apparatus to send first data to the first communications apparatus, and the first data belongs to the first service. The MAC layer of the communications module may obtain the first data from an upper layer, and transparently transmit the first data to the PHY layer of the communications module.

In a possible design, the PHY layer of the communications module may send the first data to the first communications apparatus on the first resource.

In a possible design, the upper layer is the LLC layer, the network and transport layer, the device layer, or the application of the communications module.

In a possible design, after determining that the first data belongs to the first service, the MAC layer of the communications module transparently transmits the first data to the PHY layer of the communications module.

In a possible design, the MAC layer of the communications module may determine, based on indication information of the first service, that the first data belongs to the first service, where the indication information of the first service is from the upper layer of the communications module.

In a possible design, the MAC layer of the communications module may obtain an LLC PDU from the LLC layer of the communications module, where the LLC PDU corresponds to the first data, and specifically, the LLC PDU is the first data, or the MAC layer of the communications module may obtain a device layer PDU from the device layer of the communications module, where the device layer PDU corresponds to the first data, and specifically, the device layer PDU is the first data, or the MAC layer of the communications module may obtain application data from the application module of the communications module, where the application data corresponds to the first data, and specifically, the application data is the first data.

In a possible design, the first information is further used to indicate the MAC layer of the communications module to transparently transmit the first data to the PHY layer of the communications module.

In a possible design, the MAC layer of the communications module may transfer a MAC PDU to the PHY layer of the communications module, where the MAC PDU includes only a MAC SDU, and the MAC SDU includes the first data. Specifically, the MAC SDU is the first data.

Specifically, the first information may indicate the MAC layer of the communications module to transfer the MAC PDU to the PHY layer of the communications module, where the MAC PDU includes only the MAC SDU, and the MAC SDU includes the first data. Specifically, the MAC SDU is the first data.

In a possible design, the first information may include at least one of type information of the first service, priority information of the first service, or QoS information of the first service; and the at least one of the type information of the first service, the priority information of the first service, or the QoS information of the first service is used to indicate the first service.

In a possible design, the communications module may further receive second information from the first communications apparatus, where the second information may be used to activate the first resource or used to activate transmission of the first service, and the second information may include at least one of configuration information of the first resource, the type information of the first service, the priority information of the first service, or the QoS information of the first service.

In a possible design, if the first resource is a semi-persistent resource, the configuration information of the first resource is a semi-persistent scheduling identifier.

In a possible design, the network and transport layer of the communications module may transfer the device layer PDU from the device layer of the communications module to the LLC layer of the communications module, where the device layer PDU of the communications module corresponds to the first data, and the device layer PDU includes only a device layer SDU. Specifically, the device layer PDU is the first data.

In a possible design, the device layer of the communications module may send fifth information to the network and transport layer of the communications module, where the fifth information may be used to indicate the network and transport layer of the communications module to transparently transmit the first data to the LLC layer of the communications module.

In a possible design, the LLC layer of the communications module may transfer the LLC PDU from the network and transport layer of the communications module to the MAC layer of the communications module, where the LLC PDU corresponds to the first data, and the LLC PDU includes only an LLC SDU. Specifically, the LLC PDU is the first data.

In a possible design, the network and transport layer of the communications module may send sixth information to the LLC layer of the communications module, where the sixth information may be used to indicate the LLC layer of the communications module to transparently transmit the first data to the MAC layer of the communications module.

According to a fifth aspect, an embodiment of this application provides an apparatus. The apparatus may implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal device, or a chip, a chip system, or a processor that can support the terminal device in implementing the foregoing method.

According to a sixth aspect, an embodiment of this application provides an apparatus, including a processor, where the processor is coupled to a memory, the memory is configured to store programs or instructions, and when the programs or the instructions are executed by the processor, the apparatus is enabled to implement the method according to any one of the first aspect or the possible implementations of the first aspect.

According to a seventh aspect, an embodiment of this application provides an apparatus, to implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a terminal device, or a chip, a chip system, or a processor that can support the terminal device in implementing the foregoing method.

According to an eighth aspect, an embodiment of this application provides an apparatus, including a processor, where the processor is coupled to a memory, the memory is configured to store programs or instructions, and when the programs or the instructions are executed by the processor, the apparatus is enabled to implement the method according to any one of the second aspect or the possible implementations of the second aspect.

According to a ninth aspect, an embodiment of this application provides a communications system. The communications system may include the communications apparatus in the third aspect, the fifth aspect, or the sixth aspect, and include the communications apparatus in the fourth aspect, the seventh aspect, or the eighth aspect.

According to a tenth aspect, an embodiment of this application provides a computer-readable medium. The computer-readable medium stores computer programs or instructions, and when the computer programs or instructions are executed, a computer is enabled to perform the method according to any one of the first aspect or the possible implementations of the first aspect.

According to an eleventh aspect, an embodiment of this application provides a computer program product. The computer program product includes computer program code. When the computer program code is run on a computer, the computer is enabled to perform the method according to any one of the first aspect or the possible implementations of the first aspect.

According to a twelfth aspect, an embodiment of this application provides a chip, including a processor, where the processor is coupled to a memory, the memory is configured to store programs or instructions, and when the programs or the instructions are executed by the processor, the chip is enabled to implement the method according to any one of the first aspect or the possible implementations of the first aspect.

For technical effects that can be achieved in the second aspect to the twelfth aspect, refer to the foregoing analysis and description of the first aspect and each possible design in the first aspect. Details are not described herein again.

DESCRIPTION OF EMBODIMENTS

Figure 1:
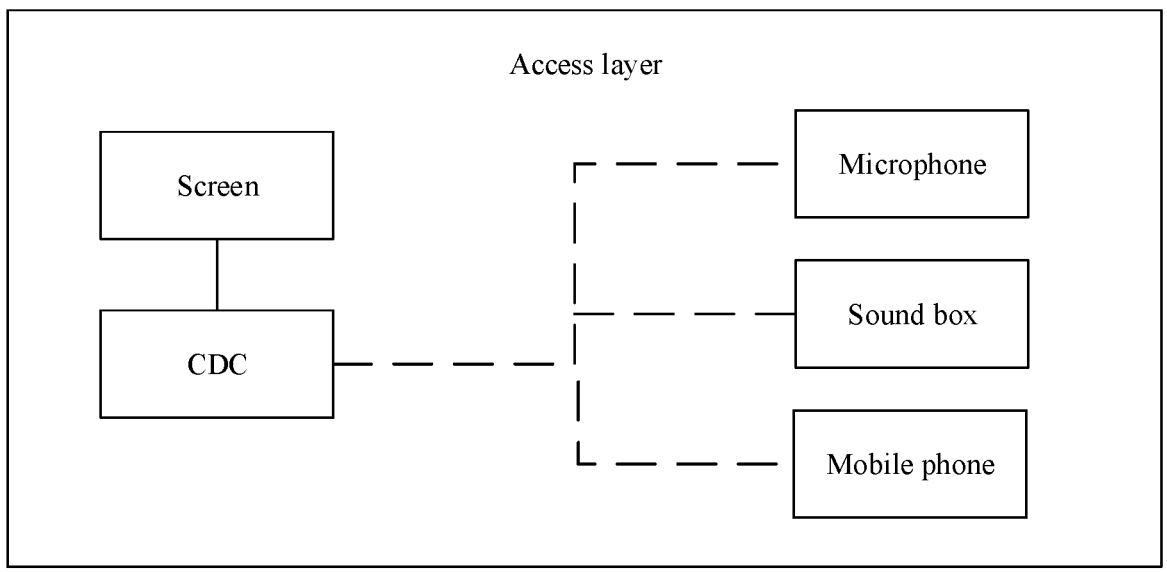
FIG. 1 is a schematic diagram of an architecture of a communications system according to an embodiment of this application.

To make the objectives, technical solutions, and advantages of this application clearer, the following further describes this application in detail with reference to the accompanying drawings.

To facilitate understanding of the technical solutions in this application, the following first briefly describes technical terms in this application.

(1) Cockpit Domain Controller

A cockpit domain controller (cockpit domain controller, CDC) is briefly referred to as a head unit. Currently, the head unit may communicate with another vehicular device, to implement functions including but not limited to a conventional radio, music video playing, navigation broadcast, and the like. In addition, the head unit may further have a cellular communications function, for example, a 3rd-generation (3rd-generation, 3G) mobile communications technology, or a 4th-generation mobile communications technology (4th generation mobile communications technology, 4G), and a telematics (telematics) function, to implement information communication between people and vehicles and between vehicles and the outside world, enhance user experience, and service-related and security-related functions.

(2) Primary Node and Secondary Node

A primary node and a secondary node indicate two types of nodes that are logically distinguished. The primary node manages the secondary node, has a resource allocation capability or a resource scheduling capability, and is responsible for allocating a time-frequency resource to the secondary node. The secondary node follows allocation of the primary node, and performs communication by using the time-frequency resource allocated by the primary node. It should be noted that attribute features of the primary node and the secondary node may change. For example, when an intelligent terminal communicates with a headset, the intelligent terminal is the primary node, and the headset is the secondary node. However, when the intelligent terminal accesses a device with a higher priority, for example, a CDC, and follows scheduling of the CDC, a role attribute of the intelligent terminal changes to the secondary node.

The time-frequency resource is allocated in two cases. One is that the primary node establishes a connection to the secondary node, and dynamically or semi-dynamically allocates the time-frequency resource to or schedules the time-frequency resource for the secondary node. The other is that the primary node establishes a connection to the secondary node, the primary node allocates a resource pool only to the secondary node, and the secondary node directly obtains the time-frequency resource from the resource pool for communication. The connection herein indicates a process of establishing a connection between the secondary node and the primary node, and existence of the secondary node is known to the primary node.

(3) Isolated Node

An isolated node is a node that does not establish a connection to a primary node and directly obtains a time-frequency resource from a pre-configured resource pool or another resource pool (for example, a resource pool that is configured for the isolated node and included in a system broadcast message of the primary node) to communicate with another terminal device. Generally, communication between isolated nodes is unknown to the primary node.

(4) Communications Domain

A communications domain includes one primary node and at least one secondary node. The at least one secondary node establishes a communication connection to the primary node. The primary node allocates a time-frequency resource to or schedules a time-frequency resource for the at least one secondary node. Each secondary node communicates with the primary node by using the scheduled or allocated time-frequency resource.

(5) Communications Domain Type

There may be a plurality of different communications domains in an intelligent cockpit environment. The different communications domains may include different node types, node capabilities, node attributes, and carried services. For example, a CDC may be used as a primary node to schedule a vehicular audio and video device. In this case, the CDC is the primary node, and the vehicular audio and video device is a secondary node. The CDC and at least one vehicular audio and video device may form a communications domain, which is referred to as a CDC domain or a head unit domain. A mobile phone may be used as a primary node to schedule an intelligent wearable device. In this case, the intelligent wearable device is a secondary node, and the mobile phone and the intelligent wearable device may form a communications domain, which is referred to as a mobile phone domain. The CDC domain and the mobile phone domain correspond to two different communications domain types.

(6) Communications Domain Priority

Different communications domains may have different priorities. This can ensure that a communications domain with a higher priority can preferably obtain a time-frequency resource, and further preferably ensure service transmission in the communications domain. For example, compared with the mobile phone domain, the CDC domain mainly ensures a service of a vehicular device, and the CDC domain may have a higher communications domain priority than the mobile phone domain.

(7) Open System Interconnection (Open System Interconnection, OSI) Reference Model An open system interconnection (OSI) reference model, as a hierarchical network architecture model proposed by international organization for standardization (ISO) in 1984, defines an abstract structure instead of a specific implementation description and aims to support interconnection and interworking of heterogeneous network systems.

The OSI reference model may include seven layers: an application layer (application layer) 7, a presentation layer (presentation layer) 6, a session layer (session layer) 5, a transport layer (transport layer) 4, a network layer (network layer) 3, a data link layer (data link layer, DDL) 2, and a physical layer (physical layer) 1. Each layer has its own set of functions and interacts with adjacent layers. The following describes each layer in the OSI reference model in detail.

The physical layer 1 provides a physical connection for the data link layer by using a transmission medium and transparently transmits a bit stream. Generally, channel coding is performed at the physical layer to ensure data transmission reliability.

The data link layer 2 ensures reliable data transmission on a physical link. Data or an instruction is encapsulated into a specific frame that can be transmitted at the physical layer. Optionally, the DDL further includes functions such as access control, resource management, data segmentation, concatenation, and error correction.

The network layer 3 is responsible for selecting a route to determine a path between two nodes. Optionally, the network layer may further perform traffic control.

The transport layer 4 is responsible for providing a network line, namely, a transmission path, for the session layer.

The session layer 5 is responsible for establishing, maintaining, and terminating a session between two nodes.

The presentation layer 6 is responsible for encoding or decoding data, so as to convert a form of the data into a format compatible with or appropriate for transmission. Optionally, the presentation layer may decrypt and encrypt data.

The application layer 7 is responsible for providing a service for an application program (also referred to as an application).

In the OSI seven-layer model, each layer provides a service for its upper layer and provides an access interface or interface for its upper layer, and the access interface or interface is referred to as a service access point (service access point, SAP). Specifically, the interface is located between each pair of adjacent layers, and defines a service access point operation and a service provided by a lower layer to an upper layer.

FIG. 1 is a schematic diagram of a communications scenario according to an embodiment of this application.

In FIG. 1, the communications scenario mainly relates to communication between a CDC and a vehicular device (for example, a vehicular audio and video device such as a microphone, a sound box, or a screen) or a non-vehicular device (for example, a mobile phone or a wearable device of a user). The CDC and the vehicular device may be disposed inside a vehicle, and the non-vehicular device may be disposed inside the vehicle, or may enter or leave the vehicle as the user moves.

Specifically, the microphone may also be referred to as a "mike", or a "mic", and may be configured to convert a sound signal into an electrical signal. When a call is made or voice information is sent, the microphone may collect a voice of a user, then convert the voice of the user into an electrical signal, and subsequently may send the electrical signal to the CDC or another device in the vehicle in a wired and/or wireless manner. In a possible example, at least one microphone may be disposed in the vehicle. In some other embodiments, two or more microphones may be disposed in the vehicle. In addition to collecting the sound signal, microphone may further implement functions such as noise reduction and directional recording.

The sound box may also be referred to as a "speaker", a "loudspeaker", or the like, and is configured to convert an audio electrical signal into a sound signal for playing. A user can listen to music or answer a hands-free call through the sound box. The sound box can also work with the microphone to reduce noise.

The screen, or referred to as a "display", may be configured to display an image, a video, or the like. The screen may include a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED (mini-LED), a micro-LED (micro-LED), a micro-OLED, a quantum dot light-emitting diode (quantum dot light-emitting diode, QLED), or the like. In some embodiments, one or more screens may be disposed in the vehicle. In addition, the screen may alternatively be a touchscreen, and may be used to obtain a touch control operation of a user.

It should be understood that the vehicular device may be configured to support wireless communications. For example, the vehicular device may include a wireless communications module (or referred to as a wireless transceiver or the like), or may be connected to a wireless communications module.

The non-vehicular device may be devices such as a terminal (terminal), a mobile station (mobile station, MS), a mobile terminal (mobile terminal), and a wearable device, or an apparatus such as a chip or a chip system in these devices. A first communications apparatus and/or a second communications apparatus can communicate with one or more network devices in one or more communications systems, and receive a network service provided by the network device. The network device herein includes but is not limited to the CDC shown in the figure, or may be a base station. For example, the first communications apparatus and/or the second communications apparatus in embodiments of this application may be a mobile phone (or referred to as a "cellular" phone), a computer with a mobile terminal, an intelligent vehicle, an intelligent device related to internet of vehicles (for example, a vehicular device in the self-driving field), a wearable device, or the like. Alternatively, the first communications apparatus and/or the second communications apparatus may be a portable, pocket-sized, handheld, computer built-in, or vehicular mobile apparatus. Alternatively, the non-vehicular device may be a communications chip having a communications module. The non-vehicular device may be configured to support wireless communications. For example, the non-vehicular device may include a wireless communications module, or be connected to a wireless communications module.

Figure 2:
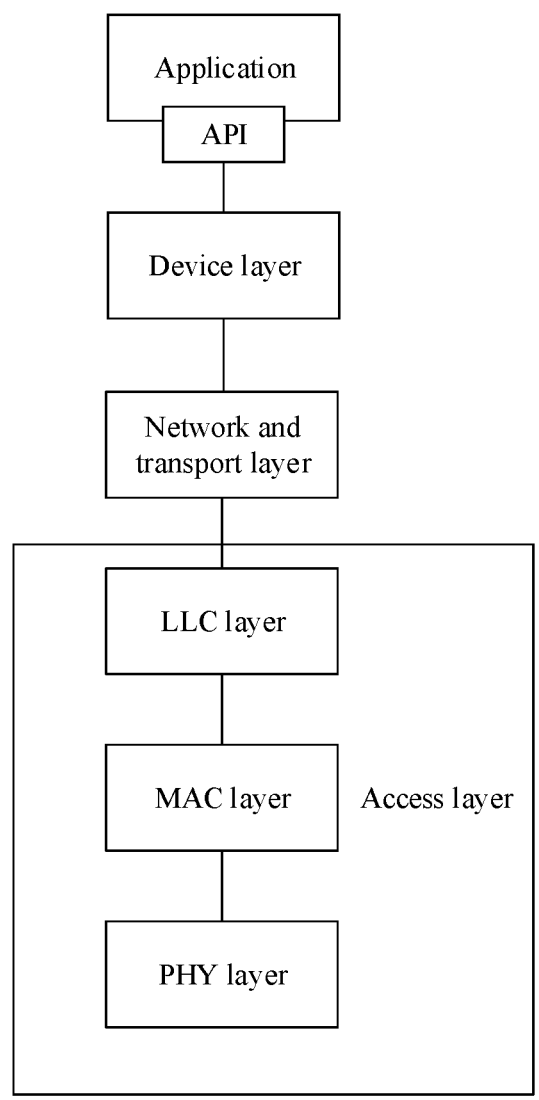
FIG. 2 is a schematic diagram of an architecture of a protocol stack according to an embodiment of this application.

FIG. 2 shows an architecture of a protocol stack in a conventional wireless communications technology. It can be seen that the architecture of the protocol stack may include protocol layers such as a device layer, a network and transport layer, and an access layer.

The access layer may provide a communications interface/means for communication between nodes. The access layer may include a plurality of different access technologies, and the different access technologies may correspond to different communications interfaces, for example, a cellular interface and a Wi-Fi interface.

Optionally, the access layer corresponds to a physical layer 1 and a data link layer 2 in an open system interconnection OSI model defined by ISO. The data link layer is subdivided into a logical link control (logical link control, LLC) layer and a media access control (media access control, MAC) layer (or referred to as a media access layer).

Because the network layer may have different networks and/or transport protocols, the LLC layer, which may also be referred to as an adaptation layer, may be configured to provide a transmission adaptation function with the different networks and/or transport protocols. For example, a data packet from a bottom layer (a protocol layer below the LLC layer) is received, an upper layer (a protocol layer above the LLC layer) protocol type to which the data packet belongs is distinguished, and the data packet is submitted (or referred to as transferred) to a corresponding upper layer protocol for processing. It should be noted that the LLC layer is a logical function layer. During implementation, the LLC layer may also be included in the network and transport layer. This is not limited in the present invention.

The network and transport layer is located above the access layer, is used to establish a connection between a source node and a destination node, and provides a reliable end-to-end data transmission service. Optionally, the network and transport layer corresponds to a network layer 3 and a transport layer 4 in the OSI model defined by ISO.

The device layer is located above the network and transport layer and is used to provide application support for a user. Optionally, the device layer is further configured to provide session/communication support and/or information support for the user. Optionally, the device layer corresponds to a session layer 5, a presentation layer 6, and an application layer 7 in the OSI model defined by ISO.

It should be understood that an upper layer of a protocol layer in this application is any protocol layer above the protocol layer, for example, an upper layer of the LLC layer, and may be the network and transport layer or the device layer. A process in which an upper layer transmits a data packet to a lower layer may be referred to as transfer. A process in which a lower layer transmits a data packet to an upper layer may be referred to as submission.

As shown in FIG. 2, information may be exchanged between the protocol layers by using the SAP, and the lower layer provides a service for the upper layer. According to a conventional wireless communications technology, at each protocol layer, a data packet transmitted by an upper layer needs to be labeled with a corresponding data packet header, so that a peer layer of a peer device parses the data packet. For example, a MAC layer of a device at a transmit end adds a MAC layer header to the data packet, a MAC of a device at a receive end needs to parse the MAC header. In this application, for a data packet transferred by an upper layer, the data packet before a header is added may be referred to as a service data unit (service data unit, SDU), and the data packet after the header is added is referred to as a protocol data unit (protocol data unit, PDU). For example, a data packet transferred by the LLC and received by the MAC layer may be referred to as a MAC SDU (also referred to as an LLC PDU), and the data packet after a header is added may be referred to as a MAC PDU after the MAC adds the header to the data packet. Correspondingly, at a receive end, a MAC may remove the header from the received MAC PDU (also referred to as a PHY SDU) to obtain the MAC SDU, and submit the MAC SDU to an upper layer.

It may be understood that, at a transmit end, if the layer transparently transmits data, a PDU generated by the layer includes only an SDU. For a data transmit end, transparent transmission indicates that the protocol layer does not encapsulate a header in a current-layer SDU (also referred to as an upper-layer PDU) from an upper layer, but directly transfers the current-layer SDU as a current-layer PDU to a lower layer. Transparent transmission may also be referred to as transparently transmitting or pass-through. It may be understood that transparent transmission indicates that in communication, no change is performed on service data content, for example, actions such as segmentation, concatenation, splicing, reordering, and header adding are not performed on the data, and the original content is transmitted from a source address to a destination address.

At a data receive end, transparent transmission indicates that the protocol layer does not decapsulate a lower-layer SDU (also referred to as a current-layer PDU) submitted by a lower layer, and directly submits the current-layer PDU as the current-layer SDU to an upper layer.

Optionally, during transparent transmission, a protocol layer (for example, a MAC layer) at a transmit end may encrypt transmission data, and a protocol layer (for example, a MAC layer) at a receive end may decrypt the data. Algorithms, parameters, and the like used for encryption and decryption may be agreed upon by both the transmit end and the receive end in advance or defined in a protocol.

Optionally, during transparent transmission, the protocol layer at the transmit end may add a cyclic redundancy check (cyclic redundancy check, CRC) check code to the transmission data, so that the protocol layer at the receive end checks the data. An algorithm and a parameter used in the CRC check operation may be agreed upon by both a primary node and a secondary node in advance or defined in a protocol. The CRC check code may be added to a tail of the transmission data.

To improve efficiency of wireless communication between a CDC and a vehicular device or between a CDC and a non-vehicular device, an embodiment of this application provides a data transmission method. The method may be performed by a first communications apparatus and a second communications apparatus. The first communications apparatus may include a primary node or a component (such as a chip, a processing circuit, or a transceiver) in the primary node. The second communications apparatus may include a secondary node or a component (such as a chip, a processing circuit, or a transceiver) in the secondary node.

Figure 3:
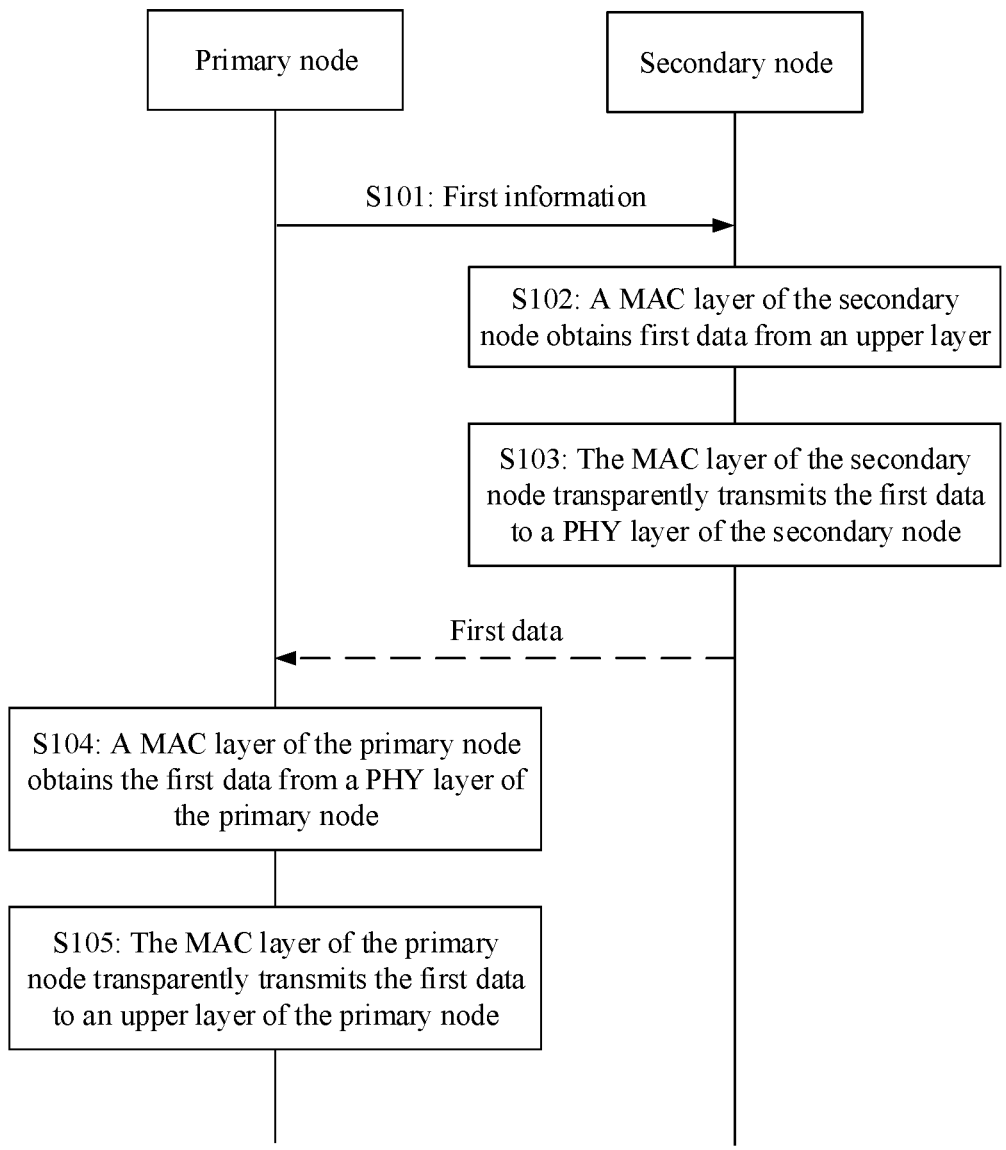
FIG. 3 is a schematic flowchart of a data transmission method according to an embodiment of this application.

As shown in FIG. 3, for example, the first communications apparatus is a primary node, and the second communications apparatus is a secondary node. The data transmission method may include the following steps.

S101: The primary node sends first information to the secondary node.

Correspondingly, the secondary node receives the first information.

The first information is used to indicate a first service and a first resource corresponding to the first service. That the first resource is used to transmit first data between the primary node and the secondary node includes that the secondary node may send the first data to the primary node by using the first resource, or the primary node may send the first data to the secondary node by using the first resource. The first data belongs to the first service. For example, the first resource is used by the secondary node to send the first data to the primary node, or is used by the primary node to send the first data to the secondary node.

For example, the first service is a vehicular service. In this application, the vehicular service may include a service such as an audio service or a video service related to a vehicular device.

Specifically, the first information may include at least one of type information, priority information, quality of service (quality of service, QoS) information, or transmission mode information of the first service, to indicate the first service. The first information may further include information such as a semi-persistent scheduling (semi-persistent scheduling, SPS) identifier (identifier, ID) and a resource index of the first resource, to indicate the first resource. The first resource is a radio transmission resource, namely, a time-frequency resource.

Before performing S101, the primary node may determine, based on the at least one of the type information, the priority information, or the QoS information of the first service, to send the first information to the secondary node. The service type information may be used to indicate a service type. For example, the service type information may be specifically an application identifier (application identifier, AID). For example, an AID 1 may be used to identify a vehicular active noise reduction service, an AID 2 may be used to indicate a vehicular video service (for example, a video transmission service between a vehicular camera and a CDC), an AID 3 may be used to identify a non-vehicular video service (for example, a video projection service between a CDC and an intelligent terminal), and the like. The priority information may be used to indicate a service priority. To support differentiated transmission based on service types, different priorities may be set for different types of services. This can ensure that data with different priorities can be differentiated during transmission at different layers of a protocol stack, and therefore preferably ensure transmission of a service with a higher priority. The QoS information may be used to indicate a service having corresponding QoS. It may be understood that different QoS information may be set for different types of services. The QoS information may include a QoS flow identifier (QoS flow ID) or a QoS index (QoS index). Each QoS flow identifier and each QoS index each may be associated with a group of QoS parameters. The QoS parameter may include but is not limited to at least one of reliability information, priority information, delay information, a transmission rate, or a transmission distance.

The primary node may store information shown in Table 1 or a part of information shown in Table 1. Table 1 may specifically include at least one of the type information, the priority information, or the QoS information of the first service. It should be understood that a service may be indicated by using one of type information, priority information, or QoS information of the service. In this case, there is a one-to-one correspondence between the service and the type information, the priority information, or the QoS information. For example, in Table 1, a service 1 may be identified by using an AID 2. In addition, a service may alternatively be indicated by using a plurality of pieces of information in type information, priority information, and QoS information of the service. For example, in Table 1, an AID of a service 2 and an AID of a service 3 each are an AID 1, and the service 2 and the service 3 may be distinguished with reference to priority information of the services. For example, the AID 1 and a priority 1 indicate the service 2, and the AID 1 and a priority 2 indicate the service 3.

TABLE 1

| Service | Type information | Priority information | QoS information |
| --- | --- | --- | --- |
| Service 1 | AID 2 | / | / |
| Service 2 | AID 1 | Priority 1 | / |

TABLE 1-continued

| Service | Type information | Priority information | QoS information |
|---|---|---|---|
| Service 3 | AID 1 | Priority 2 | |
| Service 4 | / | Priority 3 | / |
| Service 5 | AID 3 | Priority 1 | QoS index 1 |
| Service 4 | / | / | QoS index 2 |

As shown in Table 1, when the primary needs to send data to the secondary node, the primary node may identify, based on the at least one of the stored type information, priority information, or QoS information of the first service, whether the to-be-sent data is the data of the first service. The type information, the priority information, or the QoS information of the first service shown in Table 1 may be pre-stored in the primary node, or may be sent by the secondary node to the primary node, so that the primary node learns that the first information needs to be configured for the data of the first service.

When the secondary node needs to send data to the primary node, the primary node needs to schedule a resource for the secondary node. The primary node may receive, from the secondary node, information about a service to which the to-be-sent data belongs, for example, the at least one of the type information, the priority information, or the QoS information, determine, based on the at least one of the type information, the priority information, or the QoS information, that the data to be sent by the secondary node is the data of the first service, and then trigger performing of S101.

For example, as shown in Table 1, if data type information sent by the secondary node to the primary node is an AID 2, the primary node determines that the data type information is consistent with type information of data of a service 1 (the first service), and then the primary node may determine the first information, that is, perform step S101.

It should be understood that when the primary node determines that a plurality of different first services need to be scheduled, the primary node may determine different first resources for the first services. The plurality of different first services herein may be services between the primary node and different secondary nodes, or may be different services between the primary node and a same secondary node. The services are distinguished by at least one of a service type, priority information, or QoS information.

As shown in Table 2, the primary node may separately configure the different first resources for the plurality of different first services. The primary node may store a correspondence that is between the first service and the first resource and that is shown in Table 2 or some rows in Table 2. In Table 2, the primary node may represent the first service by using at least one of type information, priority information, or QoS information.

TABLE 2

| First service | First resource |
|---|---|
| Service 1 (AID 2) | Resource 1 |
| Service 3 (AID 1, priority 2) | Resource 2 |
| Service 5 (AID 3, priority 1, QoS index 1) | Resource 3 |
| ... | ... |

For example, the first information may be used to indicate the first service and the first resource corresponding to the first service that are shown in Table 2 or some rows in Table 2.

S102: A MAC layer of the secondary node obtains the first data from an upper layer.

The first data corresponds to the first service.

Specifically, the MAC layer of the secondary node may receive the first data from an LLC layer, a network and transport layer, a device layer, or an application. In a possible example, the first data is not processed at the LLC layer, the network and transport layer, or the device layer. Therefore, the first data is directly transparently transmitted from the LLC layer, the network and transport layer, or the device layer to the MAC layer.

The first data may be included in an upper-layer PDU (for example, an LLC PDU) from the upper layer, and the PDU may be referred to as a MAC SDU for the MAC layer.

For example, the first data is a PDU from the upper layer.

S103: The MAC layer of the secondary node transparently transmits the first data to a PHY layer of the secondary node.

Specifically, the MAC layer of the secondary node may transfer the MAC PDU to the PHY of the secondary node, where the MAC PDU includes only the MAC SDU. In other words, the MAC layer of the secondary node does not perform operations such as segmentation and concatenation on the first data from the upper layer, and does not add a header, but directly transfers the first data to the PHY layer.

Optionally, before transparently transmitting the first data, the MAC layer of the secondary node may perform encryption processing on the upper-layer PDU, to ensure information transmission security. An algorithm, a parameter, and the like used for encryption at the MAC layer may be agreed upon by both the primary node and the secondary node in advance or defined in a protocol.

Optionally, the MAC layer may add a CRC check code to the upper-layer PDU, so as to perform error control.

An algorithm and a parameter used in a CRC check operation may be agreed upon by both the primary node and the secondary node in advance or defined in a protocol. The CRC check code may be added to a tail of the PDU.

In an example, before performing S103, the MAC layer of the secondary node may further determine that the first data belongs to the first service. For example, the MAC layer of the secondary node may receive indication information of the first service from the upper layer, where the indication information of the first service may be used to indicate that the first data belongs to the first service. Specifically, the indication information of the first service may be carried in an SAP. The indication information of the first service may be specifically the at least one of the type information, the priority information, or the QoS information. After the MAC layer determines that the first data from the upper layer and the at least one of the type information, the priority information, or the QoS information are received, the MAC layer may determine that the first data is the data of the first service. Alternatively, before S103 is performed, the upper layer of the secondary node may send first indication information to the MAC layer of the secondary node based on the first information, to indicate the MAC layer to transparently transmit the first data. The first indication information may be carried in an SAP.

For example, after S103, the PHY layer of the secondary node may send the first data to the primary node on the first resource. Correspondingly, a PHY layer of the primary node may receive the first data on the first resource.

S104: A MAC layer of the primary node obtains the first data from the PHY layer of the primary node.

Specifically, the PHY layer of the primary node may submit a PHY SDU to the MAC layer, where the PHY SDU corresponds to the first data. That the PHY SDU corresponds to the first data may indicate that the PHY SDU is the first data.

S105: The MAC layer of the primary node transparently transmits the first data to an upper layer.

The upper layer herein is an LLC layer, a network and transport layer, a device layer, or an application of the primary node.

Specifically, the MAC layer of the primary node may submit a MAC SDU to the upper layer, where the MAC SDU may include only the PHY SDU. The MAC layer of the primary node may submit a MAC PDU to the LLC layer, the network and transport layer, the device layer, or the application. In other words, the MAC layer of the primary node submits the PHY SDU from the PHY layer to the LLC layer, the network and transport layer, the device layer, or the application.

Optionally, before transparently transmitting the first data, the MAC layer of the primary node may decrypt the PHY SDU.

Optionally, the MAC layer may decode a CRC check code of the PHY SDU. An algorithm and a parameter used in a CRC check operation may be agreed upon by both the primary node and the secondary node in advance or defined in a protocol. The CRC check code may be included in a tail of the PHY SDU.

Then, the upper layer of the primary node may make a response to the first data. For example, if the first service is an audio service, after obtaining the first data, the application may trigger audio playing.

In an example, before performing S105, the MAC layer of the primary node may further determine that the first data belongs to the first service. For example, the MAC layer of the primary node may receive indication information of the first service from the PHY layer of the primary node, where the indication information of the first service may be used to indicate that the first data belongs to the first service. Specifically, the indication information of the first service may be carried in an SAP. The indication information of the first service may be specifically information used to indicate that the first data is received on the first resource, for example, may be a resource index of the first resource. Alternatively, before S105 is performed, the PHY layer of the primary node may send second indication information to the MAC layer of the primary node based on the first resource used to receive the first data, to indicate the MAC layer to transparently transmit the first data. The second indication information may be carried in an SAP.

According to the steps in S101 to S105, the primary node can indicate the first service and the first resource corresponding to the first service to the secondary node. When the secondary node needs to send the first data of the first service, the MAC layer of the secondary node may transparently transmit the data of the first service. Correspondingly, when the primary node receives the first data of the first service, the MAC layer of the primary node transparently transmits the first data. Therefore, compared with a wireless communications protocol in the conventional technology, this application simplifies processing steps at MAC layers, and improves data transmission efficiency while implementing wireless transmission of the data of the first service between the primary node and the secondary node.

In addition, for another service other than the first service, a conventional wireless protocol stack may be used between the primary node and the secondary node. When data is sent, the MAC layer of the secondary node may perform operations, such as segmentation, concatenation, and header adding, on a data packet transferred from the upper layer. At the MAC layer of the primary node, operations such as header decapsulation, splicing, and reordering also need to be performed on a received data packet, so as to obtain the data.

In a possible implementation, the first information in S101 may further be used to indicate the MAC layer of the secondary node to transparently transmit the first data to the PHY layer of the secondary node, or the first information is used to indicate the MAC layer of the secondary node to transparently transmit all data of the first service to the PHY layer of the secondary node. Therefore, the MAC layer of the secondary node can transparently transmit the received first data to the PHY based on the first information. Alternatively, the MAC layer of the secondary node may transparently transmit the data to the PHY layer by default, as long as the data of the first service is obtained after the first information is received.

Further, the first information may be specifically used to indicate the MAC layer of the secondary node to transfer a MAC PDU to the PHY layer of the secondary node, where the MAC PDU includes only a MAC SDU, and the MAC SDU includes the first data, or the MAC SDU is the first data. Therefore, the MAC layer of the secondary node can transfer the MAC PDU to the PHY layer of the secondary node based on the first information. Alternatively, the MAC layer of the secondary node may transparently transmit the MAC PDU corresponding to the data to the PHY layer by default, as long as the data of the first service is obtained after the first information is received, where the MAC PDU includes only the MAC SDU.

In another possible implementation, before S102, the primary node may further send second information to the secondary node. The second information may be used to activate the first resource, or the second information may be used to activate transmission of the data of the first service. After receiving the second information, the secondary node may perform step S102.

Specifically, the second information may include some or all of configuration information of the first resource, the type information of the first service, the priority information of the first service, or the QoS information of the first service. The second information may be used to indicate the first service and/or the first resource in S101, to indicate that the first resource is to be activated or transmission of the first service is to be activated. The configuration information of the first resource may be used to indicate the first resource. For example, if the first resource is a semi-persistent resource, the configuration information of the first resource may include a semi-persistent scheduling (semi-persistent scheduling, SPS) identifier of the first resource, to indicate the first resource. Alternatively, the configuration information of the first resource may be information such as a resource index of the first resource.

For example, the second information and the first information may be carried in same signaling. Alternatively, the first information and the second information may be separately carried in different signaling for sending. For example, the second information may be carried in MAC control element (control element) signaling.

For example, after receiving the second information, the secondary node may send an acknowledgment response to the primary node, to indicate that the second information is received, or indicate that the first resource is activated or the data transmission of the first service is activated.

In an implementation of S102, the network and transport layer of the secondary node may transfer a device layer PDU from the device layer of the secondary node to the LLC layer of the secondary node, and then the LLC layer of the secondary node transfers an LLC PDU to the MAC layer, where the device layer PDU includes only a device layer SDU, and the device layer SDU is transferred from the application to the device layer. The device layer PDU corresponds to the first data. Specifically, the device layer PDU is the first data. In other words, the network and transport layer of the secondary node does not process the device layer PDU, that is, transparently transmits the device layer PDU to the LLC layer.

In this example, the device layer of the secondary node may further send fifth information to the network and transport layer of the secondary node, where the fifth information is used to indicate the network and transport layer of the secondary node to transfer the device layer PDU from the device layer of the secondary node to the LLC layer of the secondary node, or the fifth information is used to indicate the network and transport layer of the secondary node to transparently transmit the data of the first service to the LLC layer of the secondary node. The fifth indication information may be carried in an SAP.

Further, the LLC layer of the secondary node may transfer the LLC PDU from the secondary node to the MAC layer of the secondary node, where the LLC PDU includes only an LLC SDU, and the LLC PDU corresponds to the first data, or the LLC PDU is the first data. In other words, the LLC layer of the secondary node does not process the LLC PDU, that is, transparently transmits the LLC PDU to the MAC layer.

In this example, the network and transport layer of the secondary node may further send sixth information to the LLC layer, where the sixth information may be used to indicate the LLC layer to transparently transmit the first data to the MAC layer.

In addition, in this example, the first information may be used to indicate the network and transport layer of the secondary node to transparently transmit the first data from the device layer of the secondary node to the LLC layer of the secondary node when the secondary node sends the first data, and then indicate the LLC layer of the secondary node to transparently transmit the first data to the MAC layer of the secondary node, so that the secondary node performs the foregoing implementation.

Correspondingly, during implementation of S105, the MAC layer of the primary node may submit a MAC SDU to the LLC layer of the primary node, and then the LLC layer of the primary node may submit the MAC SDU to the network and transport layer of the primary node, where the MAC SDU corresponds to the first data, or the MAC SDU is the first data. In other words, the LLC layer of the primary node does not process the MAC SDU, that is, transparently transmits the MAC SDU to the network and transport layer.

In this example, the MAC layer of the primary node may send third information to the LLC layer, where the third information is used to indicate the LLC layer of the primary node to transparently transmit the first data to the network and transport layer, and the third indication information may be carried in an SAP.

Further, the network and transport layer of the primary node may receive an LLC SDU from the LLC layer of the primary node, and submit the LLC SDU to the device layer of the primary node, where the LLC SDU corresponds to the first data, or the LLC SDU is the first data. In other words, the network and transport layer of the primary node does not process the LLC SDU, that is, transparently transmits the LLC SDU to the device layer.

In this example, the LLC layer of the primary node may further send fourth information to the network and transport layer of the primary node, where the fourth information may be used to indicate the network and transport layer of the primary node to transparently transmit the first data.

In the foregoing embodiment, the data transmission method provided in this embodiment of this application is described from a perspective of sending the first data by the secondary node to the primary node. It should be understood that if the primary node sends the first data to the secondary node, the following steps may be performed after S101.

S201: The MAC layer of the primary node obtains the first data from the upper layer of the primary node.

For a specific implementation in which the MAC layer of the primary node obtains the first data from the upper layer, refer to the foregoing description of the implementation of S102. Details are not described herein again.

S202: The MAC layer of the primary node transparently transmits the first data to the PHY layer of the primary node.

For a specific implementation in which the MAC layer of the primary node transparently transmits the first data to the PHY layer of the primary node, refer to the foregoing description of the implementation of S103. Details are not described herein again.

Before S202, the MAC layer of the primary node may further receive the indication information of the first service from the upper layer of the primary node, to indicate that the first data belongs to the first service.

S203: The MAC layer of the secondary node obtains the first data.

For a specific implementation in which the MAC layer of the secondary node obtains the first data, refer to the foregoing description of the implementation of S104. Details are not described herein again.

S204: The MAC layer of the secondary node transparently transmits the first data to the upper layer.

For a specific implementation in which the MAC layer of the secondary node transparently transmits the first data to the upper layer, refer to the foregoing description of the implementation of S105. Details are not described herein again.

Before S204, the MAC layer of the secondary node may further receive the indication information of the first resource from the PHY layer of the secondary node, to indicate that the first data is transmitted on the first resource. Then, the MAC layer of the secondary node may determine, based on the correspondence that is between the first service and the first resource and that is indicated by the first information, that the first data belongs to the first service.

According to steps S101 and S201 to S204, the primary node may indicate the first service and the first resource corresponding to the first service to the secondary node. When the primary node needs to send the first data of the first service, the MAC layer of the primary node may transparently transmit the data of the first service. Correspondingly, when the secondary node receives the first data of the first service, the MAC layer of the secondary node transparently transmits the first data. Therefore, compared with a wireless communications protocol in the conventional technology, this application simplifies processing steps at MAC layers, and improves data transmission efficiency while implementing wireless transmission of the data of the first service between the primary node and the secondary node.

In addition, for another service other than the first service, a conventional wireless protocol stack may be used between the primary node and the secondary node. When data is sent, the MAC layer of the primary node may perform operations, such as segmentation, concatenation, and header adding, on a data packet transferred from the upper layer. At the MAC layer of the secondary node, operations such as header decapsulation, splicing, and reordering also need to be performed on a received data packet, so as to obtain the data.

In a possible implementation, before S201, the primary node may further send seventh information to the secondary node, where the seventh information may be used to activate the first resource, or the seventh information may be used to activate transmission of the data of the first service. After receiving the seventh information, the secondary node may perform step S204. For an implementation of the seventh information, refer to the foregoing description of the second information.

In a possible implementation, the first information in S101 may further be used to indicate the MAC layer of the secondary node to transparently transmit the first data to the upper layer of the secondary node, or the first information is used to indicate the MAC layer of the secondary node to transparently transmit all data of the first service to the upper layer of the secondary node. The MAC layer of the secondary node is configured to perform step S204 based on the first information. Alternatively, the MAC layer of the secondary node may transparently transmit the data to the upper layer by default, as long as the data of the first service is obtained after the first information is received.

In a possible implementation of S201, the upper layer of the primary node may transparently transmit the data to the MAC layer of the primary node, and the upper layer of the primary node may be an LLC layer, a network and transport layer, a device layer, or an application of the primary node. For an implementation in which the upper layer of the primary node transparently transmits the data to the MAC layer of the primary node, refer to the implementation in which the upper layer of the secondary node transparently transmits the data to the MAC layer of the secondary node. The upper layer of the secondary node may include the LLC layer, the network and transport layer, the device layer, or the application of the secondary node.

Correspondingly, in a possible implementation of S204, the first information may be specifically used to indicate the MAC layer of the secondary node to submit the MAC SDU to the upper layer of the secondary node. Specifically, for an implementation in which the MAC layer of the secondary node submits the MAC SDU to the upper layer of the secondary node, refer to the foregoing description in which the MAC layer of the primary node submits the MAC SDU to the upper layer of the primary node (namely, the LLC layer, the network and transport layer, the device layer, or the application of the primary node).

In correspondence to the method provided in the foregoing method embodiments, an embodiment of this application further provides a corresponding apparatus. The apparatus includes corresponding modules configured to perform the foregoing embodiments. The module may be software, hardware, or a combination of software and hardware. The apparatus may be the primary node (or the first communications apparatus), or may be a chip, a chip system, a processor, or the like that supports the primary node (or the first communications apparatus) in implementing the foregoing method. The apparatus may be the secondary node (or the second communications apparatus), or may be a chip, a chip system, a processor, or the like that supports the secondary node (or the second communications apparatus) in implementing the foregoing method. The apparatus may be configured to implement the method described in the foregoing method embodiment.

Figure 4:
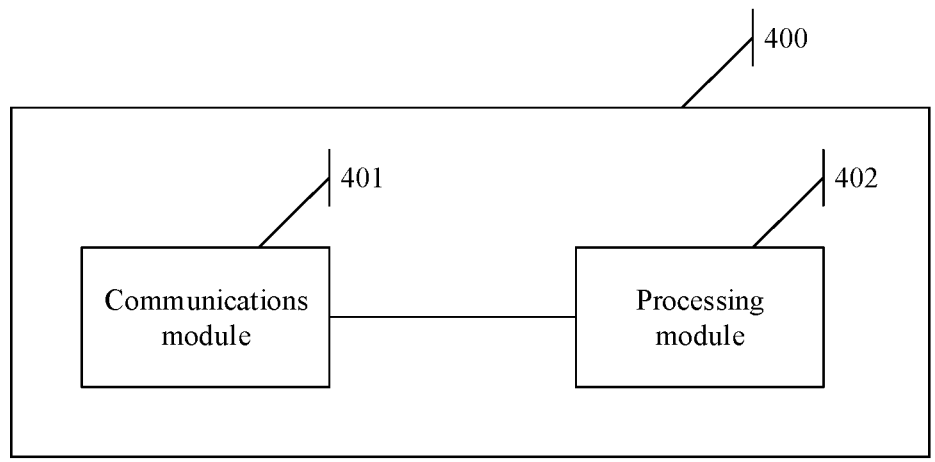
FIG. 4 is a schematic diagram of a structure of a communications apparatus according to an embodiment of this application.
Figure 5:
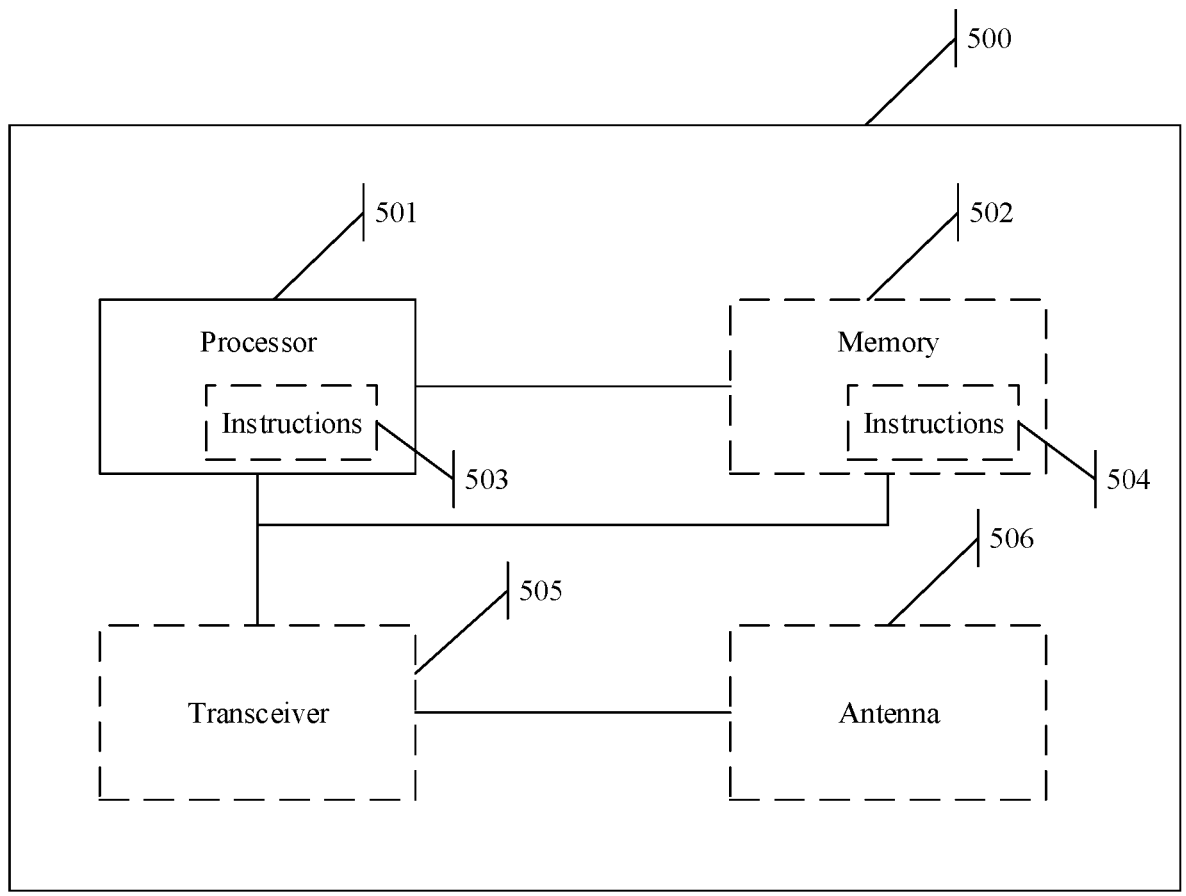
FIG. 5 is a schematic diagram of a structure of another communications apparatus according to an embodiment of this application.

FIG. 4 is a schematic diagram of a structure of modularization of the apparatus, and FIG. 5 is a schematic diagram of a structure of a hardware component of the apparatus. As shown in FIG. 4, the apparatus may include the communications module 401 and the processing module 402. As shown in FIG. 5, the apparatus may include a processor 501, and may further include one or more components of a memory 502, a transceiver 505, or an antenna 506.

When the primary node (or the first communications apparatus) or the secondary node (or the second communications apparatus) is a terminal device or user equipment, the communications module 401 or the transceiver 505 may be a sending unit or a transmitter when sending information, and the communications module 401 or the transceiver 505 may be a receiving unit or a receiver when receiving information. A transceiver unit may be a transceiver. The transceiver, the transmitter, or the receiver may be a radio frequency circuit. When the primary node (or the first communications apparatus) or the secondary node (or the second communications apparatus) includes a storage unit (for example, the memory 502), the storage unit may be configured to store computer instructions. The processing module 402 or the processor 501 is in communication connection to the memory. The processing module 402 or the processor 501 executes the computer instructions stored in the memory, so that the primary node (or the first communications apparatus) or the secondary node (or the second communications apparatus) performs the method in the embodiment in FIG. 3. The processing module 402 or the processor 501 may be a general-purpose central processing unit (CPU), a microprocessor, or an application-specific integrated circuit (application-specific integrated circuit, ASIC).

When the primary node (or the first communications apparatus) or the secondary node (or the second communications apparatus) is a chip, the communications module 401 or the transceiver 505 may be an input and/or output interface, a pin, a circuit, or the like. The processing module 402 or the processor 501 may execute the computer-executable instructions stored in the storage unit, so that the chip in the primary node (or the first communications apparatus) or the secondary node (or the second communications apparatus) performs the method in FIG. 3. Optionally, the storage unit (for example, the memory 502) is a storage unit in the chip, for example, a register or a cache. The storage unit may alternatively be a storage unit in the terminal but outside the chip, for example, a read-only memory (read-only memory, ROM) or another type of static storage device that can store static information and instructions, or a random access memory (random access memory, RAM).

As shown in FIG. 4, a communications apparatus provided in an embodiment of this application may include a communications module 401 and a processing module 402. The communications module 401 and the processing module 402 are coupled to each other. The communications apparatus 400 may be configured to perform the steps performed by the primary node (or the first communications apparatus) or the secondary node (or the second communications apparatus) shown in the foregoing method embodiment. The communications module 401 may be configured to support the communications apparatus 400 in communication. The communications module 401 may also be referred to as a communications unit, a communications interface, a transceiver module, or a transceiver unit. The communications module 401 may have a wireless communications function, for example, can communicate with another communications apparatus in a wireless communications manner. The communications module 401 may be configured to include a PHY layer, a MAC layer, an LLC layer, a network and transport layer, a device layer, or an application, and is configured to perform the steps performed by the PHY layer, the MAC layer, the LLC layer, the network and transport layer, the device layer, or the application in the foregoing method embodiment.

The processing module 402 may also be referred to as a processing unit, and may be configured to support the communications apparatus 400 in performing the processing action performed by the primary node or the secondary node in the foregoing method embodiment, including but not limited to: generating information and a message sent by the communications module 401, and/or demodulating and decoding a signal received by the communications module 401.

When performing the steps of the primary node in the foregoing method embodiment, the communications module 401 may be configured to send first information to a second communications apparatus, where the first information is used to indicate a first service and a first resource corresponding to the first service, the first resource may be to be used by the second communications apparatus to send first data to the communications apparatus 400, and the first data belongs to the first service. The MAC layer of the communications module 401 may obtain the first data, and transparently transmit the first data to an upper layer.

In a possible design, the upper layer is a logical link control LLC layer, a network and transport layer, a device layer, or an application of the communications module 401.

In a possible design, the PHY layer of the communications module 401 may receive the first data from the second communications apparatus on the first resource. Then, the PHY layer of the communications module 401 may submit the first data and indication information of the first resource to the MAC layer of the communications module 401.

In a possible design, the MAC layer of the communications module 401 may further determine that the first data belongs to the first service, and then transparently transmit the first data to the upper layer.

In a possible design, the MAC layer of the communications module 401 may determine, based on the indication information of the first resource and a correspondence between the first resource and the first service, that the first data belongs to the first service. The indication information of the first resource is from the PHY layer of the communications module 401. For example, the indication information of the first resource is carried in an SAP from the PHY layer of the communications module 401.

In a possible design, the MAC layer of the communications module 401 may submit a PHY SDU from the PHY layer of the communications module 401 to the LLC layer of the communications module 401, or the MAC layer of the communications module 401 may submit a PHY SDU from the PHY layer of the communications module 401 to the device layer, or the MAC layer of the communications module 401 submits a PHY SDU from the PHY layer of the communications module 401 to the application, where the PHY SDU corresponds to the first data. Specifically, the PHY SDU is the first data.

In a possible design, the first information is further used to indicate a MAC layer of the second communications apparatus to transparently transmit the first data to a PHY layer of the second communications apparatus.

Specifically, the first information may be used to indicate the MAC layer of the second communications apparatus to transfer a MAC PDU to the PHY layer of the second communications apparatus, where the MAC PDU includes only a MAC SDU, and the MAC SDU includes the first data.

In a possible design, the first information may include at least one of type information of the first service, priority information of the first service, or QoS information of the first service, to indicate the first service.

In a possible design, the communications module 401 may further send second information to the second communications apparatus, where the second information is used to activate the first resource or used to activate transmission of the first service, and the second information includes at least one of configuration information of the first resource, the type information of the first service, the priority information of the first service, or the QoS information of the first service.

In a possible design, if the first resource is a semi-persistent resource, the configuration information of the first resource may include a semi-persistent scheduling identifier.

In a possible design, the LLC layer of the communications module 401 may submit the MAC SDU from the MAC layer of the communications module 401 to the network and transport layer of the communications module 401, where the MAC SDU corresponds to the first data. Specifically, the MAC SDU is the first data.

In a possible design, the MAC layer of the communications module 401 may send third information to the LLC layer of the communications module 401, where the third information may be used to indicate the LLC layer of the communications module 401 to transparently transmit the first data to the network and transport layer of the communications module 401.

In a possible design, the network and transport layer of the communications module 401 may submit an LLC SDU from the LLC layer of the communications module 401 to the device layer of the communications module 401, where the LLC SDU corresponds to the first data. Specifically, the LLC SDU is the first data.

In a possible design, the LLC layer of the communications module 401 may send fourth information to the network and transport layer of the communications module 401, where the fourth information is used to indicate the network and transport layer of the communications module 401 to transparently transmit the first data to the device layer of the communications module 401, and the fourth information may be carried in an SAP that is sent by the LLC layer of the communications module 401 to the network and transport layer of the communications module 401.

When performing the steps of the secondary node in the foregoing method embodiment, the communications module 401 may be configured to receive first information from a first communications apparatus, where the first information is used to indicate a first service and a first resource corresponding to the first service, the first resource is to be used by the communications apparatus 400 to send first data to the first communications apparatus, and the first data belongs to the first service. The MAC layer of the communications module 401 may obtain the first data from an upper layer, and transparently transmit the first data to the PHY layer of the communications module 401.

In a possible design, the PHY layer of the communications module 401 may send the first data to the first communications apparatus on the first resource.

In a possible design, the upper layer is the LLC layer, the network and transport layer, the device layer, or the application of the communications module 401.

In a possible design, after determining that the first data belongs to the first service, the MAC layer of the communications module 401 transparently transmits the first data to the PHY layer of the communications module 401.

In a possible design, the MAC layer of the communications module 401 may determine, based on indication information of the first service, that the first data belongs to the first service, where the indication information of the first service is from the upper layer of the communications module 401.

In a possible design, the MAC layer of the communications module 401 may obtain an LLC PDU from the LLC layer of the communications module 401, where the LLC PDU corresponds to the first data, and specifically, the LLC PDU is the first data, or the MAC layer of the communications module 401 may obtain a device layer PDU from the device layer of the communications module 401, where the device layer PDU corresponds to the first data, and specifically, the device layer PDU is the first data, or the MAC layer of the communications module 401 may obtain application data from the application module of the communications module 401, where the application data corresponds to the first data, and specifically, the application data is the first data.

In a possible design, the first information is further used to indicate the MAC layer of the communications module 401 to transparently transmit the first data to the PHY layer of the communications module 401.

In a possible design, the MAC layer of the communications module 401 may transfer a MAC PDU to the PHY layer of the communications module 401, where the MAC PDU includes only a MAC SDU, and the MAC SDU includes the first data. Specifically, the MAC SDU is the first data.

Specifically, the first information may indicate the MAC layer of the communications module 401 to transfer the MAC PDU to the PHY layer of the communications module 401, where the MAC PDU includes only the MAC SDU, and the MAC SDU includes the first data. Specifically, the MAC SDU is the first data.

In a possible design, the first information may include at least one of type information of the first service, priority information of the first service, or QoS information of the first service; and the at least one of the type information of the first service, the priority information of the first service, or the QoS information of the first service is used to indicate the first service.

In a possible design, the communications module 401 may further receive second information from the first communications apparatus, where the second information may be used to activate the first resource or used to activate transmission of the first service, and the second information may include at least one of configuration information of the first resource, the type information of the first service, the priority information of the first service, or the QoS information of the first service.

In a possible design, if the first resource is a semi-persistent resource, the configuration information of the first resource is a semi-persistent scheduling identifier.

In a possible design, the network and transport layer of the communications module 401 may transfer the device layer PDU from the device layer of the communications module 401 to the LLC layer of the communications module 401, where the device layer PDU of the communications module 401 corresponds to the first data, and the device layer PDU includes only a device layer SDU. Specifically, the device layer PDU is the first data.

In a possible design, the device layer of the communications module 401 may send fifth information to the network and transport layer of the communications module 401, where the fifth information may be used to indicate the network and transport layer of the communications module 401 to transparently transmit the first data to the LLC layer of the communications module 401.

In a possible design, the LLC layer of the communications module 401 may transfer the LLC PDU from the network and transport layer of the communications module 401 to the MAC layer of the communications module 401, where the LLC PDU corresponds to the first data, and the LLC PDU includes only an LLC SDU. Specifically, the LLC PDU is the first data.

In a possible design, the network and transport layer of the communications module 401 may send sixth information to the LLC layer of the communications module 401, where the sixth information may be used to indicate the LLC layer of the communications module 401 to transparently transmit the first data to the MAC layer of the communications module 401.

FIG. 5 is a schematic diagram of a structure of another communications apparatus according to an embodiment of this application. The communications apparatus may be implemented by hardware components. The apparatus 500 shown in FIG. 5 may be the primary node shown in the method embodiment, or may be a chip, a chip system, a processor, or the like that supports the primary node in implementing the foregoing method. Alternatively, the apparatus 500 may be the secondary node, or may be a chip, a chip system, a processor, or the like that supports the secondary node in implementing the foregoing method. The apparatus 500 may be configured to implement the method performed by the primary node or the secondary node described in the foregoing method embodiment. For details, refer to the description in the foregoing method embodiment. The apparatus 500 has a function of implementing the primary node or the secondary node described in embodiments of this application. For example, the apparatus 500 includes modules, units, or means (means) corresponding to the related steps for the primary node or the secondary node to perform the terminal described in embodiments of this application. The functions, units, or means may be implemented by software, hardware, or hardware executing corresponding software, or a combination of software and hardware. For details, refer to the corresponding descriptions in the foregoing corresponding method embodiment.

The apparatus 500 may include one or more processors 501. The processor 501 may also be referred to as a processing unit, and may implement a specific control function. The processor 501 may be a general-purpose processor, a dedicated processor, or the like. For example, the processor may be a baseband processor or a central processing unit. The baseband processor may be configured to process a communications protocol and communications data. The central processing unit may be configured to control the communications apparatus (for example, a base station, a baseband chip, a terminal, a terminal chip, a distributed unit (distributed unit, DU), or a centralized unit (centralized unit, CU)), execute a software program, and process data of the software program.

In an optional design, the processor 501 may store instructions 503 and/or data, and the instructions 503 and/or data may be run by the processor, so that the apparatus 500 performs the method described in the foregoing method embodiment.

In another optional design, the processor 501 may include a transceiver unit configured to implement receiving and sending functions. For example, the transceiver unit may be a transceiver circuit, an interface, or an interface circuit. The transceiver circuit, the interface, or the interface circuit used to implement the receiving and sending functions may be separated, or may be integrated together. The transceiver circuit, the interface, or the interface circuit may be used to read and write code/data. Alternatively, the transceiver circuit, the interface, or the interface circuit may be used to transmit or transfer a signal.

In another possible design, the apparatus 500 may include a circuit. The circuit may implement a sending, receiving, or communications function in the foregoing method embodiment.

Optionally, the apparatus 500 may include one or more memories 502. The memory may store instructions 504, and the instructions may be run on the processor, so that the apparatus 500 performs the method described in the foregoing method embodiment. Optionally, the memory may further store data. Optionally, the processor may also store instructions and/or data. The processor and the memory may be separately disposed, or may be integrated together. For example, the correspondence described in the foregoing method embodiment may be stored in the memory or stored in the processor. The processor 501 and/or the memory 502 may be considered as the processing module 402 shown in FIG. 4.

Optionally, the apparatus 500 may further include a transceiver 505 and/or an antenna 506. The processor 501 may be referred to as a processing unit, and controls the apparatus 500. The transceiver 505 may be referred to as a transceiver unit, a transceiver machine, a transceiver circuit, a transceiver apparatus, a transceiver module, or the like, and is configured to implement sending and receiving functions. The transceiver 505 and/or the antenna 506 may be considered as the communications module 401 shown in FIG. 4.

Optionally, the apparatus 500 in this embodiment of this application may be configured to perform the method described in the foregoing embodiment of this application. The processor 501 may be configured to perform the steps performed by the processing module 402 shown in FIG. 4, and the transceiver 505 may be configured to perform the steps performed by the communications module 401 shown in FIG. 4. For specific steps performed by the processor 501 and the transceiver 505, refer to the descriptions of the steps performed by the processing module 402 or the communications module 401 in FIG. 4. Details are not described herein again.

The processor and the transceiver in this application may be implemented in an integrated circuit (integrated circuit, IC), an analog IC, a radio frequency integrated circuit RFIC, a mixed signal IC, an application-specific integrated circuit (application-specific integrated circuit, ASIC), a printed circuit board (printed circuit board, PCB), an electronic device, or the like. The processor and the transceiver may be manufactured by using various IC processing technologies, for example, a complementary metal oxide semiconductor (complementary metal oxide semiconductor, CMOS), an N-type metal oxide semiconductor (n-type metal oxide semiconductor, NMOS), a P-type metal oxide semiconductor (p-type metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus described in the foregoing embodiment may be the terminal device. However, a range of the apparatus described in this application is not limited thereto, and a structure of the apparatus may not be limited to the structure in FIG. 5. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (MSM);

(4) a module that can be embedded in another device;

(5) a receiver, a terminal, an intelligent terminal, a cellular phone, a wireless device, a handheld device, a mobile unit, a vehicular device, a network device, a cloud device, an artificial intelligence device, a machine device, a home device, a medical device, an industrial device; or (6) another device.

It should be understood that the components included in the communications apparatus in the foregoing embodiments are illustrative, and are merely a possible example; and may have another composition manner in an actual implementation. In addition, the components in the foregoing communications apparatus may be integrated into one module, or may exist independently physically. The foregoing integrated module may be implemented in a form of hardware, or may be implemented in a form of a software function module. It should not be understood that the structure shown in the foregoing accompanying drawings is limited.

Based on a same concept as a concept of the foregoing method embodiment, an embodiment of this application further provides a computer-readable storage medium. The computer-readable storage medium stores a computer program. When the program is executed by a processor, the computer is enabled to implement the operation performed by the primary node (or the first communications apparatus) or the secondary node (or the second communications apparatus) in any one of the method embodiment or possible implementations of the method embodiment.

Based on a same concept as a concept of the foregoing method embodiment, this application further provides a computer program product. When the computer program product is invoked and executed by a computer, the computer is enabled to implement the operation performed by the primary node (or the first communications apparatus) or the secondary node (or the second communications apparatus) in any one of the method embodiment or possible implementations of the method embodiment.

Based on a same concept as a concept of the foregoing method embodiment, this application further provides a chip or a chip system. The chip may include a processor. The chip may further include a memory (or a storage module) and/or a transceiver (or a communications module); or the chip is coupled to a memory (or a storage module) and/or a transceiver (or a communications module). The transceiver (or the communications module) may be configured to support the chip in performing wired and/or wireless communications. The memory (or the storage module) may be configured to store a program. The processor invokes the program to implement the operation performed by the primary node (or the first communications apparatus) or the secondary node (or the second communications apparatus) in any one of the method embodiment or possible implementations of the method embodiment. The chip system may include the chip, or may include the chip and another discrete component, such as a memory (or a storage module) and/or a transceiver (or a communications module).

Based on a same concept as a concept of the foregoing method embodiment, this application further provides a communications system. The communications system may be configured to implement the operation performed by the primary node (or the first communications apparatus) or the secondary node (or the second communications apparatus) in any one of the method embodiment or possible implementations of the method embodiment. For example, the communications system has the structure shown in FIG. 1.

Embodiments of this application are described with reference to the flowcharts and/or block diagrams of the method, the apparatus, and the computer program product according to embodiments. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

What is claimed is:

1. A data transmission method, comprising:
    sending, by a first communications apparatus, first information to a second communications apparatus, wherein the first communications apparatus comprises a cockpit domain controller of a vehicle, and the second communications apparatus comprises a vehicular device or a non-vehicular device, the first information indicates a first service and a first resource corresponding to the first service, the first service comprises a vehicular service, the first resource is used to carry first data, the first data belongs to the first service, and the first information comprises a semi-persistent scheduling (SPS) identifier to indicate the first resource to be used by the second communications apparatus to carry the first data;
    receiving, by a physical (PHY) layer of the first communications apparatus, the first data from the second communications apparatus on the first resource;
    obtaining, by a media access control (MAC) layer of the first communications apparatus, the first data; and
    transparently transmitting, by the MAC layer of the first communications apparatus, the first data to an upper layer by directly submitting a MAC layer protocol data unit (PDU) as a MAC layer service data unit (SDU) to the upper layer without decapsulation, wherein the MAC PDU comprises the first data.

2. The method according to claim 1, wherein the method further comprises:
    submitting, by the PHY layer of the first communications apparatus, the first data and indication information of the first resource to the MAC layer of the first communications apparatus.

3. The method according to claim 1, wherein the upper layer is a logical link control (LLC) layer, a network and transport layer, a device layer, or an application.

4. The method according to claim 1, wherein before the transparently transmitting, by the MAC layer of the first communications apparatus, the first data to an upper layer, the method further comprises:
    determining, by the MAC layer of the first communications apparatus, that the first data belongs to the first service.

5. The method according to claim 4, wherein the determining, by the MAC layer of the first communications apparatus, that the first data belongs to the first service comprises:
    determining, by the MAC layer of the first communications apparatus based on indication information of the first resource and a correspondence between the first resource and the first service, that the first data belongs to the first service, wherein the indication information of the first resource is from a PHY layer of the first communications apparatus and comprises the SPS identifier.

6. The method according to claim 1, wherein the transparently transmitting, by the MAC layer of the first communications apparatus, the first data to an upper layer comprises:
    submitting, by the MAC layer of the first communications apparatus, a PHY SDU from a PHY layer of the first communications apparatus to an LLC layer of the first communications apparatus; or
    submitting, by the MAC layer of the first communications apparatus, a PHY SDU from a PHY layer of the first communications apparatus to a device layer; or
    submitting, by the MAC layer of the first communications apparatus, a PHY SDU from the PHY layer of the first communications apparatus to an application, wherein the PHY SDU corresponds to the first data.

7. The method according to claim 6, wherein the PHY SDU is the first data.

8. A data transmission method, comprising:
    receiving, by a second communications apparatus, first information from a first communications apparatus, wherein the first communications apparatus comprises a cockpit domain controller of a vehicle, and the second communications apparatus comprises a vehicular device or a non-vehicular device, the first information indicates a first service and a first resource corresponding to the first service, the first service comprises a vehicular service, the first resource is used to carry first data, the first data belongs to the first service, and the first information comprises a semi-persistent scheduling (SPS) identifier to indicate the first resource to be used by the second communications apparatus to carry the first data;

obtaining, by a media access control (MAC) layer of the second communications apparatus, the first data from an upper layer; and transparently transmitting, by the MAC layer of the second communications apparatus, the first data to a PHY layer of the second communications apparatus by directly transferring a MAC service data unit (SDU) as a MAC protocol data unit (PDU) to the PHY layer without encapsulating a header in the MAC PDU, wherein the MAC SDU comprises the first data.

9. The method according to claim 8, wherein the method further comprises:

sending, by the PHY layer of the second communications apparatus, the first data to the first communications apparatus on the first resource.

10. The method according to claim 8, wherein the upper layer is a logical link control (LLC) layer, a network and transport layer, a device layer, or an application.

11. The method according to claim 8, wherein before the transparently transmitting, by the MAC layer of the second communications apparatus, the first data to a PHY layer of the second communications apparatus, the method further comprises:

determining, by the MAC layer of the second communications apparatus, that the first data belongs to the first service.

12. The method according to claim 11, wherein the determining, by the MAC layer of the second communications apparatus, that the first data belongs to the first service comprises:

determining, by the MAC layer of the second communications apparatus based on indication information of the first service, that the first data belongs to the first service, wherein the indication information of the first service is from the upper layer and comprises the SPS identifier.

13. The method according to claim 8, wherein the obtaining, by a MAC layer of the second communications apparatus, the first data from an upper layer comprises:

obtaining, by the MAC layer of the second communications apparatus, an LLC PDU from an LLC layer of the second communications apparatus, wherein the LLC PDU corresponds to the first data; or obtaining, by the MAC layer of the second communications apparatus, a device layer PDU from a device layer of the second communications apparatus, wherein the device layer PDU corresponds to the first data; or obtaining, by the MAC layer of the second communications apparatus, application data from an application of the second communications apparatus, wherein the application data corresponds to the first data.

14. The method according to claim 8, wherein the first information further indicates the MAC layer of the second communications apparatus to transparently transmit the first data to the PHY layer of the second communications apparatus.

15. An apparatus, comprising:
one or more processors; and
at least one non-transitory storage medium in communication with the one or more processors, wherein the at least one non-transitory storage medium stores instructions that, when executed by the one or more processors, cause the apparatus to:

send first information to a second communications apparatus, wherein the apparatus comprises a cockpit domain controller of a vehicle, and the second communications apparatus comprises a vehicular device or a non-vehicular device, the first information indicates a first service and a first resource corresponding to the first service, the first service comprises a vehicular service, the first resource is used to carry first data, the first data belongs to the first service, and the first information comprises a semi-persistent scheduling (SPS) identifier to indicate the first resource to be used by the second communications apparatus to carry the first data;

receive the first data from the second communications apparatus on the first resource by a PHY layer of the apparatus;

obtain the first data by a MAC layer of the apparatus; and transparently transmit the first data to an upper layer by the MAC layer of the apparatus by directly submitting a MAC layer protocol data unit (PDU) as a MAC layer service data unit (SDU) to the upper layer without decapsulation, wherein the MAC PDU comprises the first data.

16. The apparatus according to claim 15, wherein the apparatus further comprises a PHY layer, wherein the instructions further cause the apparatus to:

submit, by the PHY layer of the apparatus, the first data and indication information of the first resource to the MAC layer of the apparatus.

17. The apparatus according to claim 15, wherein the upper layer is a logical link control (LLC) layer, a network and transport layer, a device layer, or an application.

18. The apparatus according to claim 15, wherein the instructions further cause the apparatus to:

determine that the first data belongs to the first service by the MAC layer of the apparatus.

19. The apparatus according to claim 18, wherein the instructions further cause the apparatus to:

determine by the MAC layer of the apparatus, based on indication information of the first resource and a correspondence between the first resource and the first service, that the first data belongs to the first service, wherein the indication information of the first resource is from a PHY layer of the apparatus and comprises the SPS identifier.

20. The apparatus according to claim 15, wherein:
the apparatus further comprises an LLC layer, and the instructions further cause the apparatus to submit, by the MAC layer of the apparatus, a PHY SDU from a PHY layer of the apparatus to the LLC layer of the apparatus; or the apparatus further comprises a device layer, and the instructions further cause the apparatus to submit, by the MAC layer of the apparatus, a PHY SDU from the PHY layer of the apparatus to the device layer of the apparatus; or the apparatus further comprises an application, and the instructions further cause the apparatus to submit, by the MAC layer of the apparatus, a PHY SDU from the PHY layer of the apparatus to the application of the apparatus, wherein the PHY SDU corresponds to the first data.

21. The apparatus according to claim 20, wherein the PHY SDU is the first data.

22. The apparatus according to claim 15, wherein the first information further indicates a MAC layer of the second communications apparatus to transparently transmit the first data to a PHY layer of the second communications apparatus.

23. An apparatus, comprising:
one or more processors; and
at least one non-transitory storage medium in communication with the one or more processors, wherein the at least one non-transitory storage medium stores instructions that, when executed by the one or more processors, cause the apparatus to:
receive first information from a first communications apparatus, wherein the first communications apparatus comprises a cockpit domain controller of a vehicle, and the apparatus comprises a vehicular device or a non-vehicular device, the first information indicates a first service and a first resource corresponding to the first service, the first service comprises a vehicular service, the first resource is used to carry first data, the first data belongs to the first service, and the first information comprises a semi-persistent scheduling (SPS) identifier to indicate the first resource to be used by the apparatus to carry the first data;
obtain the first data from an upper layer by a MAC layer of the apparatus; and
transparently transmit the first data to a PHY layer of the apparatus by the MAC layer of the apparatus by directly transferring a MAC service data unit (SDU) as a MAC protocol data unit (PDU) to the PHY layer without encapsulating a header in the MAC PDU, wherein the MAC SDU comprises the first data.

24. The apparatus according to claim 23, wherein the instructions further cause the apparatus to:
send, by the PHY layer of the apparatus, the first data to the first communications apparatus on the first resource.

25. The apparatus according to claim 23, wherein the upper layer is a logical link control (LLC) layer, a network and transport layer, a device layer, or an application.

26. The apparatus according to claim 23, wherein the instructions further cause the apparatus to:
determine that the first data belongs to the first service by the MAC layer of the apparatus.

27. The apparatus according to claim 26, wherein the instructions further cause the apparatus to:
determine, by the MAC layer of the apparatus, based on indication information of the first service, that the first data belongs to the first service, wherein the indication information of the first service is from the upper layer and comprises the SPS identifier.

28. The apparatus according to claim 23, wherein the apparatus further comprises an LLC layer, and the instructions further cause the apparatus to:
obtain, by the MAC layer of the apparatus, an LLC PDU from the LLC layer of the apparatus, wherein the LLC PDU corresponds to the first data; or
the apparatus further comprises a device layer, and the instructions further cause the apparatus to:
obtain, by the MAC layer of the apparatus, a device layer PDU from the device layer of the apparatus, wherein the device layer PDU corresponds to the first data; or
the apparatus further comprises an application, and the instructions further cause the apparatus to:
obtain, by the MAC layer of the apparatus, application data from the application of the apparatus, wherein the application data corresponds to the first data.

29. The apparatus according to claim 23, wherein the first information is further used to indicate the MAC layer of the apparatus to transparently transmit the first data to the PHY layer of the apparatus.

30. The apparatus according to claim 23, wherein the MAC PDU is the same as the MAC SDU.

31. A communications system, wherein the communication system comprises a first communication apparatus and a second communication apparatus, wherein:
the first communications apparatus comprises a cockpit domain controller of a vehicle, and the second communications apparatus comprises a vehicular device or a non-vehicular device, the first communication apparatus is configured to send first information to the second communications apparatus, wherein the first information indicates a first service and a first resource corresponding to the first service, the first service comprises a vehicular service, the first resource is used to carry first data, the first data belongs to the first service, and the first information comprises a semi-persistent scheduling (SPS) identifier to indicate the first resource to be used by the second communications apparatus to carry the first data;
the second communication apparatus is configured to receive the first information from the first communications apparatus, wherein a media access control (MAC) layer of the second communication apparatus obtains the first data from an upper layer of the second communication apparatus, and the MAC layer of the second communication apparatus transparently transmits the first data to a PHY layer of the second communications apparatus by directly transferring a MAC service data unit (SDU) as a MAC protocol data unit (PDU) to the PHY layer of the second communications apparatus without encapsulating a header in the MAC PDU, wherein the MAC SDU comprises the first data;
a MAC layer of the first communication apparatus is configured to obtain the first data; and
the MAC layer of the first communication apparatus is further configured to transparently transmit the first data to an upper layer of first communication apparatus.

32. The method according to claim 1, wherein the first information comprises service type information that indicates a service type of the first service, wherein the service type information that indicates the service type of the first service is a vehicular active noise reduction service.

* * * * *